(12) United States Patent
Kang

(10) Patent No.: US 9,384,007 B2
(45) Date of Patent: Jul. 5, 2016

(54) MEMORY VIRTUALIZATION-BASED SNAPSHOT BOOT APPARATUS AND METHOD

(71) Applicant: Electronics and Telecommunications Research Institute, Daejeon (KR)

(72) Inventor: Dong-Wook Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 279 days.

(21) Appl. No.: 14/142,458

(22) Filed: Dec. 27, 2013

(65) Prior Publication Data

US 2014/0297998 A1  Oct. 2, 2014

(30) Foreign Application Priority Data

Mar. 28, 2013  (KR) ........................ 10-2013-0033376

(51) Int. Cl.
*G06F 9/44* (2006.01)
*G06F 9/45* (2006.01)
*G06F 9/455* (2006.01)

(52) U.S. Cl.
CPC ............ *G06F 9/4401* (2013.01); *G06F 9/4406* (2013.01); *G06F 9/45558* (2013.01); *G06F 9/45533* (2013.01); *G06F 2009/45575* (2013.01)

(58) Field of Classification Search
CPC .. G06F 9/4401; G06F 9/4406; G06F 9/45558
See application file for complete search history.

(56) References Cited

U.S. PATENT DOCUMENTS

| | | | |
|---|---|---|---|
| 2010/0174943 A1* | 7/2010 | Liu | G06F 11/1438 714/15 |
| 2010/0306774 A1* | 12/2010 | Kalbarga | G06F 9/441 718/1 |
| 2012/0144182 A1 | 6/2012 | Nam et al. | |
| 2013/0179670 A1* | 7/2013 | Liu | G06F 9/4406 713/2 |

FOREIGN PATENT DOCUMENTS

| | | |
|---|---|---|
| KR | 10-2010-0041518 A | 4/2010 |
| KR | 10-2012-0062968 A | 6/2012 |

* cited by examiner

*Primary Examiner* — Stefan Stoynov

(57) ABSTRACT

The present invention relates to a memory virtualization-based snapshot boot apparatus and method. The memory virtualization-based snapshot boot apparatus includes hardware unit including a processor, memory, and storage, the storage storing status information corresponding to an operating system, and a Virtual Machine Monitor (VMM) operated by the processor and configured to operate the operating system by loading the status information into the memory. In accordance with the present invention, technology for loading only a part of a snapshot image and booting a system is implemented using virtualization technology, thus shortening the booting time of the system.

14 Claims, 7 Drawing Sheets

MEMORY VIRTUALIZATION-BASED SNAPSHOT BOOT APPARATUS AND METHOD

CROSS REFERENCE TO RELATED APPLICATION

This application claims the benefit of Korean Patent Application No. 10-2013-0033376, filed on Mar. 28, 2013, which is hereby incorporated by reference in its entirety into this application.

BACKGROUND OF THE INVENTION

1. Technical Field

The present invention relates generally to a virtualization-based snapshot boot apparatus and method. More particularly, the present invention relates to a virtualization-based snapshot boot apparatus and method, which implement technology for loading only a part of a snapshot image and booting a system using virtualization technology, thus shortening the time required to boot the system.

2. Description of the Related Art

Generally, it takes a lot of time for a computer to complete system initialization from the time at which power is applied to the computer and the computer starts to boot. Therefore, there is a problem in that, even after power has been applied, a user who desires to execute a specific application must wait for the completion of booting so as to run the application. In particular, in the case of an embedded device such as a smart phone, a Portable Multimedia Player (PMP), or a vehicle navigation device which has been widely used, a user may feel inconvenienced when he or she cannot use the device immediately after power has been applied.

In particular, in order for embedded devices that were programmed in the level of firmware in the past and that have a relatively low speed to boot an operating system such as current Linux or Windows Mobile, booting time is further lengthened, and thus efforts to optimize booting speed have been made.

Meanwhile, the status information of a computer system at a specific time is recorded in a conventional snapshot image, which has been used to restore the status of the system at the time of operation to the stored status. Further, such a snapshot image has been used to minimize standby power and shorten booting time. Recently, even in the field of embedded systems, as a large-scale platform such as the Android platform has been used, snapshot booting technology has been utilized to shorten the lengthened booting time. Korean Patent Application Publication No. 2012-0062968 loads all memory status information upon booting and does not specify methods of storing the status information of the operating system or the like, thus having limitations in the optimization of booting speed. Therefore, there is a requirement for a memory virtualization-based snapshot boot apparatus and method, which access the status information of the system for each type, load only status information other than the memory information of a snapshot image, and then boot the system.

SUMMARY OF THE INVENTION

Accordingly, the present invention has been made keeping in mind the above problems occurring in the prior art, and an object of the present invention is to provide an apparatus and method that load only a part of a snapshot image and then boot a system.

Another object the present invention is to provide an apparatus and method that boot a system by efficiently operating the system using virtualization technology when loading a part of a snapshot image and booting the system.

A further object of the present invention is to provide an apparatus and method that process a page fault, occurring because memory status information is not loaded after snapshot booting based on memory virtualization has been performed, via the page fault handler of a virtual machine monitor.

In accordance with an aspect of the present invention to accomplish the above objects, there is provided a memory virtualization-based snapshot boot apparatus, including hardware unit including a processor, memory, and storage, the storage storing status information corresponding to an operating system; and a Virtual Machine Monitor (VMM) operated by the processor and configured to operate the operating system by loading the status information into the memory, wherein the status information is capable of being stored as a snapshot image, the snapshot image being classified and stored depending on types of the status information, and wherein the virtual machine monitor comprises a determination unit for determining whether a header of the snapshot image is valid and a loading unit for, if it is determined by the determination unit that the snapshot image header is valid, loading the snapshot image, and wherein the loading unit is capable of classifying and loading the snapshot image depending on the types of the status information.

Preferably, the snapshot image may be stored such that the types of the status information are classified into Central Processing Unit (CPU) status information, peripheral device status information, memory page table and Memory Management Unit (MMU) status information, and memory status information.

Preferably, the loading unit may load CPU status information, peripheral device status information, and memory page table and MMU status information.

Preferably, the memory page table may be a primary page table managed by the operating system, and a secondary page table set to cause a page fault for an address translated by the primary page table may be generated.

Preferably, the virtual machine monitor may be configured such that, when the page fault occurs, a memory page in which the page fault occurs is loaded from the memory status information stored in the storage into the memory via a page fault handler, and a page table entry is updated.

Preferably, the status information may include a plurality of pieces of status information corresponding to different operating systems, and the loading unit may load one of the plurality of pieces of status information into the memory.

Preferably, the virtual machine monitor may update the status information stored in the storage after the status information has been loaded into the memory.

In accordance with another aspect of the present invention to accomplish the above objects, there is provided a memory virtualization-based snapshot boot method, including operating a virtual memory monitor; loading a header of a snapshot image; determining whether the snapshot image header is valid; and loading the snapshot image, wherein the snapshot image is classified depending on types of the status information and is stored in the storage, wherein loading the snapshot image is configured to, if it is determined at validity determining that the snapshot image header is valid, classify and load the snapshot image depending on types of the status information, and wherein if it is determined at validity determining that the snapshot image header is not valid, normal booting is performed without loading the snapshot image being performed.

Preferably, the snapshot image may be stored such that the types of the status information are classified into Central Processing Unit (CPU) status information, peripheral device status information, memory page table and Memory Management Unit (MMU) status information, and memory status information.

Preferably, loading the snapshot image may be configured to load CPU status information, peripheral device status information, and memory page table and MMU status information.

Preferably, the memory page table may be a primary page table managed by the operating system, and a secondary page table set to cause a page fault for an address translated by the primary page table may be generated.

Preferably, the virtual machine monitor may be configured such that, when the page fault occurs, a memory page in which the page fault occurs is loaded from the memory status information stored in the storage into memory via a page fault handler, and a page table entry is updated.

Preferably, the status information may include a plurality of pieces of status information corresponding to different operating systems, and loading the snapshot image may be configured to load one of the plurality of pieces of status information into the memory.

Preferably, the virtual machine monitor may update the status information stored in the storage after the status information has been loaded into the memory.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
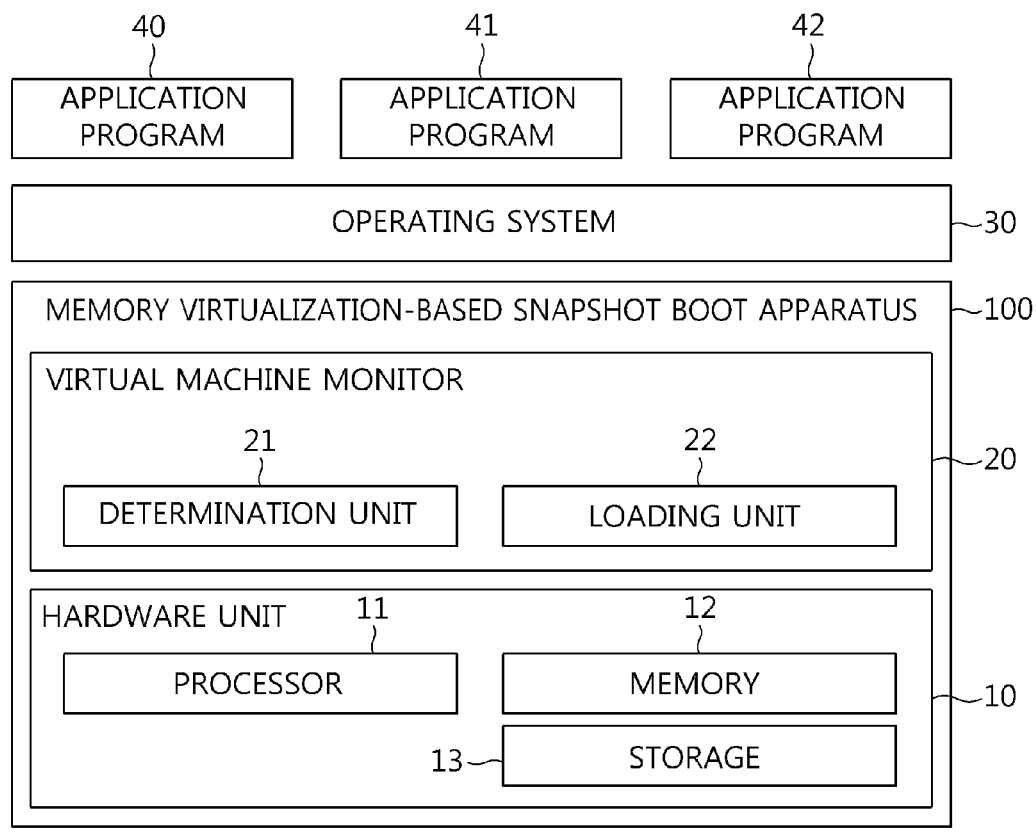
FIG. 1 is a block diagram showing the configuration of a memory virtualization-based snapshot boot apparatus according to the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

In the present specification, the term "virtualization" denotes Operating System (OS) virtualization technology. The term "OS virtualization" denotes technology for virtualizing hardware resources and enabling a plurality of operating systems to run on a single physical machine. Such virtualization technology includes functionality capable of suspending an operating system that is currently running and/or resuming the suspended operating system. This functionality may be accomplished by storing the status information of the currently running operating system in a file-format image and by subsequently restoring the status of the operating system using the stored image file at a desired time.

Embodiments described in the present specification may have aspects that are complete hardware, are partial hardware and partial software, or are complete software. In the present specification, the term "apparatus," "interface," or "system" denotes a computer-related entity, such as hardware, a combination of hardware and software, or software. For example, in the present specification, an apparatus, an interface, or a system may be, but is not limited to, a process in execution, a processor, an object, an executable file, a thread of execution, a program, and/or a computer. For example, both an application, currently being executed on the computer, and the computer may correspond to an apparatus, an interface, or a system in the present specification.

Hereinafter, a memory virtualization-based snapshot boot apparatus according to the present invention will be described in detail.

FIG. 1 is a diagram showing the configuration of a memory virtualization-based snapshot boot apparatus according to the present invention.

Referring to FIG. 1, a memory virtualization-based snapshot boot apparatus 100 according to the present invention chiefly includes hardware unit 10 and a memory virtualization manager (Virtual Machine Monitor: VMM) 20. The hardware unit 10 may include a processor 11 such as a Central Processing Unit (CPU), memory 12 for providing a task area for the processor, and storage 13 for storing the status information of an operating system 30. The storage 13 may include, but is not limited to, a magnetic storage medium such as a hard disc, and/or an optical storage medium such as a Compact Disc (CD) or a Digital Versatile Disc (DVD).

The memory virtualization-based snapshot boot apparatus 100 according to the present invention may boot a system using a snapshot image. A snapshot image may be the status information of the system obtained when initial booting is completed. The status information of the system may be the status information of devices included in hardware unit, that is, the processor, the memory, and an input/output (I/O) device that is a peripheral device. For example, immediately after the booting of the system has been completed, the memory virtualization-based snapshot boot apparatus 100 generates a snapshot image. The generated snapshot image may be present in a specific region of the memory 12. The memory virtualization-based snapshot boot apparatus 100 stores the generated snapshot image in the storage 13. The storage 13 may store information even if the supply of power is interrupted, unlike the memory 12. When the system resumes, the memory virtualization-based snapshot boot apparatus 100 loads the snapshot image stored in the storage 13 into the memory 12, thus enabling fast booting to be performed.

Figure 2:
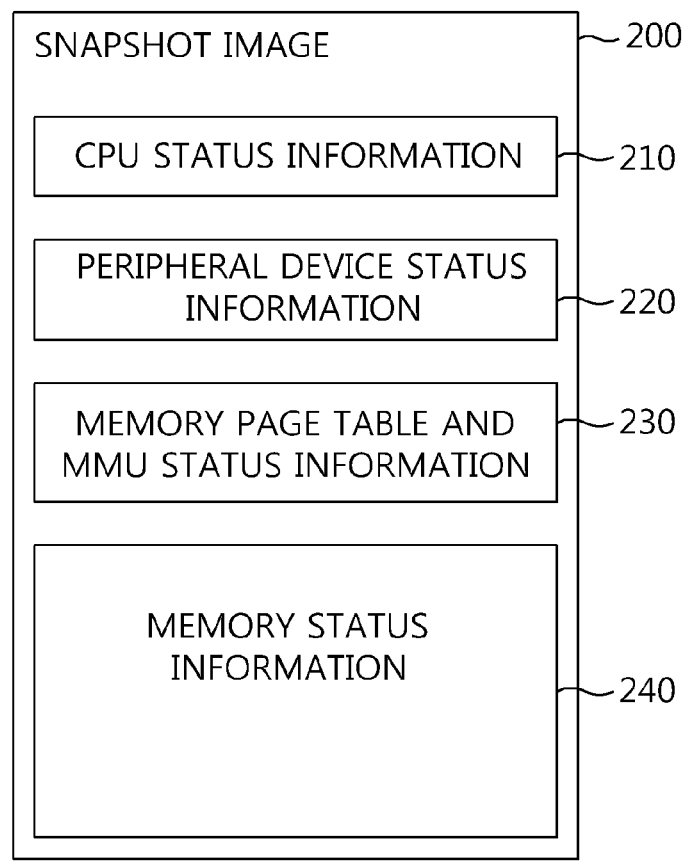
FIG. 2 is a diagram showing the configuration of a snapshot image according to the present invention.

FIG. 2 is a diagram showing the configuration of a snapshot image according to the present invention.

Referring to FIG. 2, a snapshot image 200 may be classified and stored depending on the types of status information. For example, the types of status information may be classified into Central Processing Unit (CPU) status information 210, peripheral device status information 220, memory page table and Memory Management Unit (MMU) status information 230, and memory status information 240.

Referring to FIGS. 1 and 2, the virtual machine monitor 20 includes a determination unit 21 for determining whether the header of a snapshot image is valid, and a loading unit 22 for loading the snapshot image.

In relation to the implementation of the memory virtualization-based snapshot boot apparatus, a description will be made below. First, power is applied to the system, and the virtual machine monitor 20 is operated. Further, after reading the header of the snapshot image from the storage, the determination unit 21 examines the snapshot image header for validity. If it is determined that the snapshot image header is not valid, normal booting without restoring the snapshot image is performed, whereas if it is determined that the snapshot image header is valid, the loading unit 22 loads a part of the status information stored in the snapshot image. Here, the loaded status information may include memory page table and MMU status information or the like. As described above, the reason for loading only a part of the status information stored in the snapshot image is that most of the time required for snapshot booting is consumed in reading the snapshot image stored in the storage 13 into the memory 12, and most of the snapshot image is the memory status information 240 of the pieces of status information. As described above, if the status information of the operating system stored in the form of a snapshot image is loaded into the memory, the operating system may be restored to a state in which the booting procedure has been completed. In this case, the same effect as that obtained when the operating system is actually booted may be obtained by loading the status information of the operating system, on which all initialization procedures including the initialization of a device driver or the like have been completed, into the memory. As a result, the time required for the initialization of the device driver, the initialization of various types of kernel data structures, and other initialization programs is eliminated, and the status information of the operating system that has been booted only needs to be loaded into the memory. Accordingly, the time required to boot the system after the power has been applied to the apparatus is greatly reduced. Further, since the status information of the operating system that has been booted is previously stored in the form of a snapshot image in the storage 13 of the hardware unit 10, fast booting may be performed even when power is turned off and is applied again. Furthermore, when a variation such as the upgrade of the operating system 30 occurs later in the operating system 30, the status information snapshot image of the operating system 30 stored in the storage 13 is updated in correspondence with the variation of the operating system 30, thus enabling the management of the snapshot image to be flexibly performed. For example, the virtual machine monitor 20 may be configured to update the status information of the operating system 30 either in response to specific user input or automatically. The loading unit 22 of the virtual machine monitor 20 may incrementally load the snapshot image. In detail, booting may be completed after only status information other than the memory status information 240 occupying a largest portion of the status information of the snapshot image has been loaded, rather than after all pieces of status information of the snapshot image have been loaded. Therefore, there is an advantage in that booting time may be shortened.

For example, when system booting starts and the virtual machine monitor is operated, if the snapshot image header is loaded and is determined to be valid, the process returns to the time of restoration of status information by loading only the status information other than the memory status information 240 from the snapshot image, thus completing booting.

Figure 3:
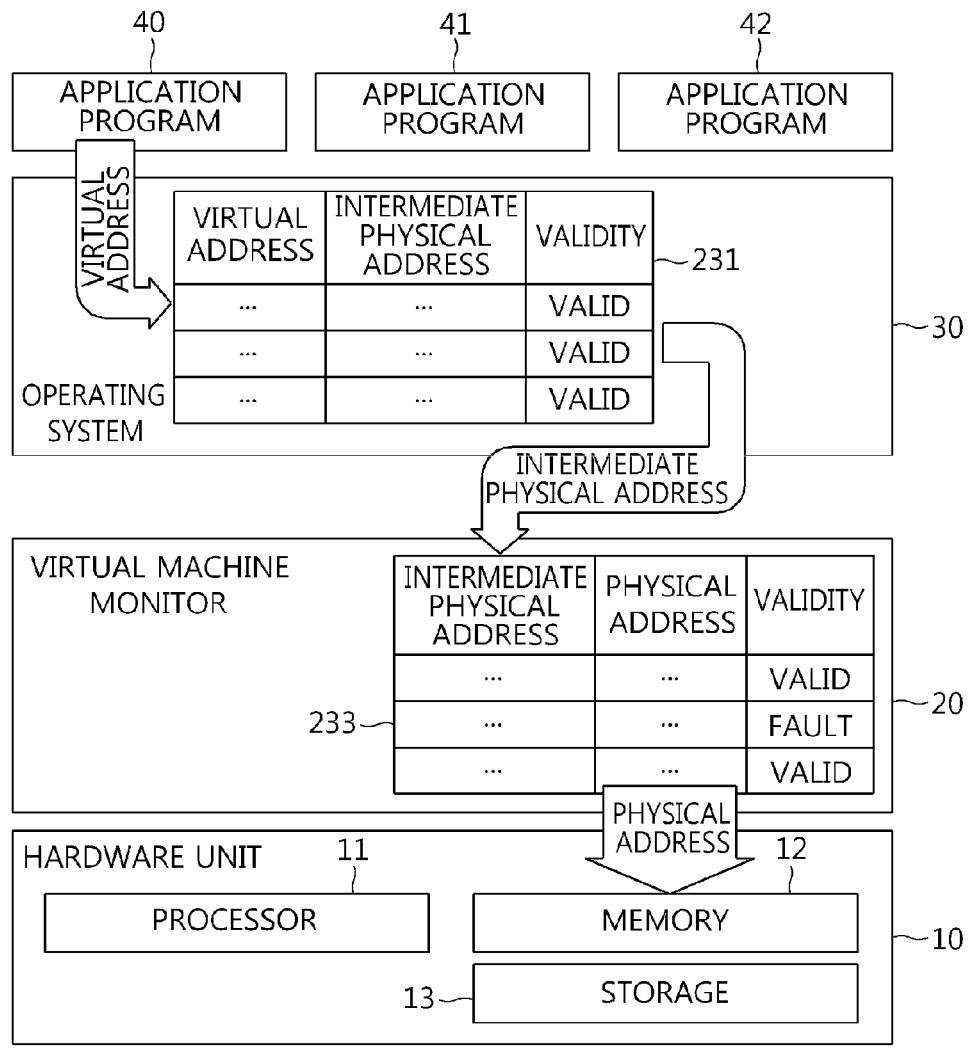
FIG. 3 is a diagram showing a page table according to the present invention, which shows a 2-stage page table.

FIG. 3 is a diagram showing a page table according to the present invention, which shows a 2-stage page table.

Generally, when the operating system 30 refers to the memory 12, a paging technique for dividing a memory region into units of discontinuous pages and allocating addresses to the pages has been widely used. In this paging technique, the memory is referred to in such a way as to allocate actual continuous physical addresses as discontinuous logical addresses to pages, and map the actual physical addresses to the logical addresses using Page Table Entries (PTE). In this case, since the logical addresses are different from the actual physical addresses, the memory is called virtual memory, and the logical addresses are called virtual addresses.

Referring to FIG. 3, in the present invention, a 2-stage memory page table is managed and is composed of a primary page table 231 managed by the existing operating system 30 and a secondary page table 233 managed by the virtual machine monitor 20.

The addresses of the memory accessed by the operating system 30 or the application program 40, 41, or 42 are translated by the primary page table 231 of the operating system, and are translated again by the secondary page table 233 via the virtual machine monitor 20 and are used when the actual physical memory is accessed. Consequently, by means of the management of the secondary page table 233, an assortment is provided such that all pieces of memory information seem to be loaded by the operating system 30, thus enabling booting to be completed.

Figure 4:
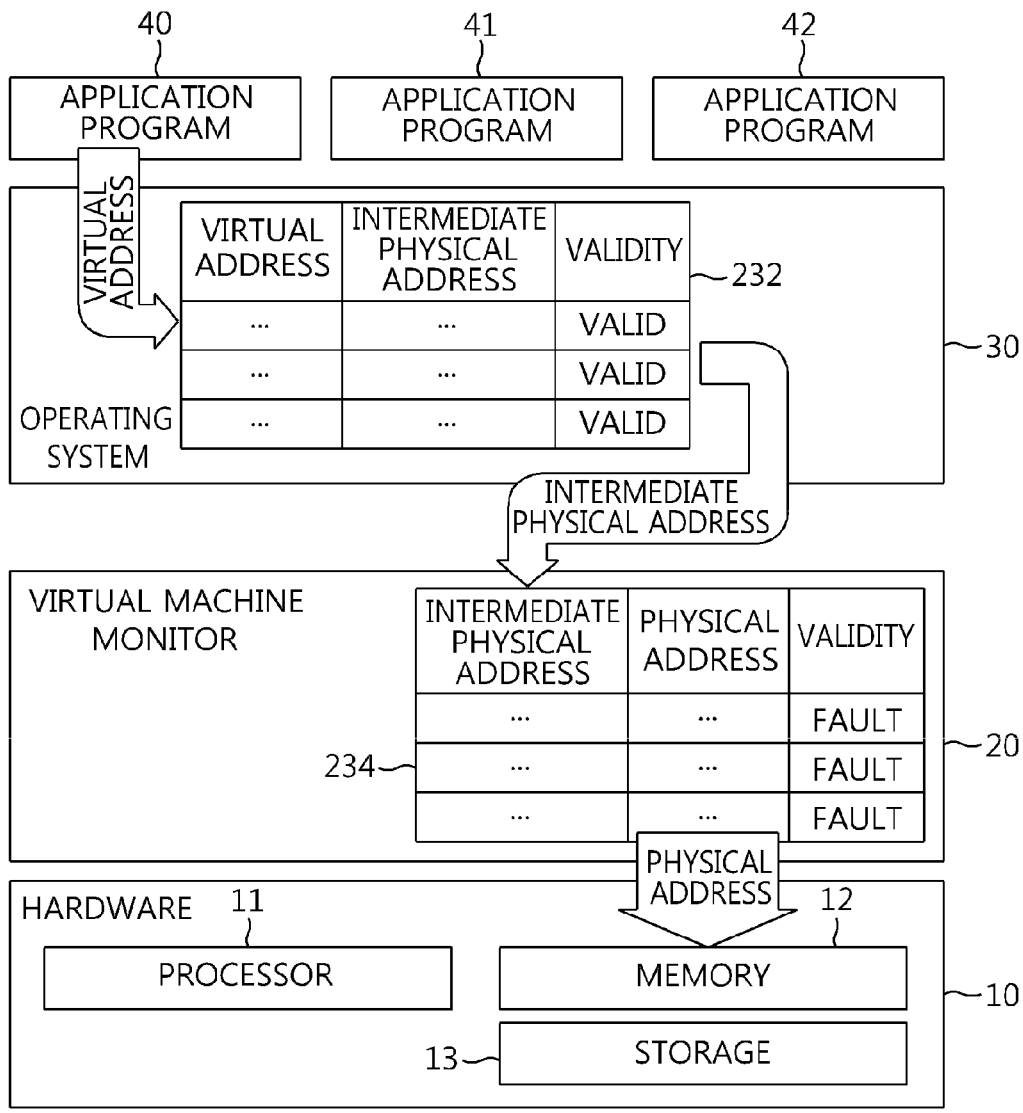
FIG. 4 is a diagram showing the setup of a secondary page table immediately after booting has been performed according to the present invention.

FIG. 4 is a diagram showing the setup of a secondary page table immediately after booting has been performed according to the present invention.

Referring to FIG. 4, the setup of the page table appearing immediately after booting has been performed can be seen. In detail, if it is assumed that the status information of the system including the page table being in the state of FIG. 3 is stored as a snapshot image, the status of the page table appearing immediately after booting has been performed using the snapshot image is illustrated in FIG. 4. Referring continuously to FIG. 4, after booting has been completed, all rows of a secondary page table 234 are set to 'fault', which shows natural results caused by a fact that the present invention completes booting without loading the memory status information 240 of the snapshot image. In other words, since a memory page accessed by the application program 40, 41, or 42 or the operating system 30 is not valid immediately after booting, a page fault occurs during the execution of the application program or the OS after booting.

Figure 5:
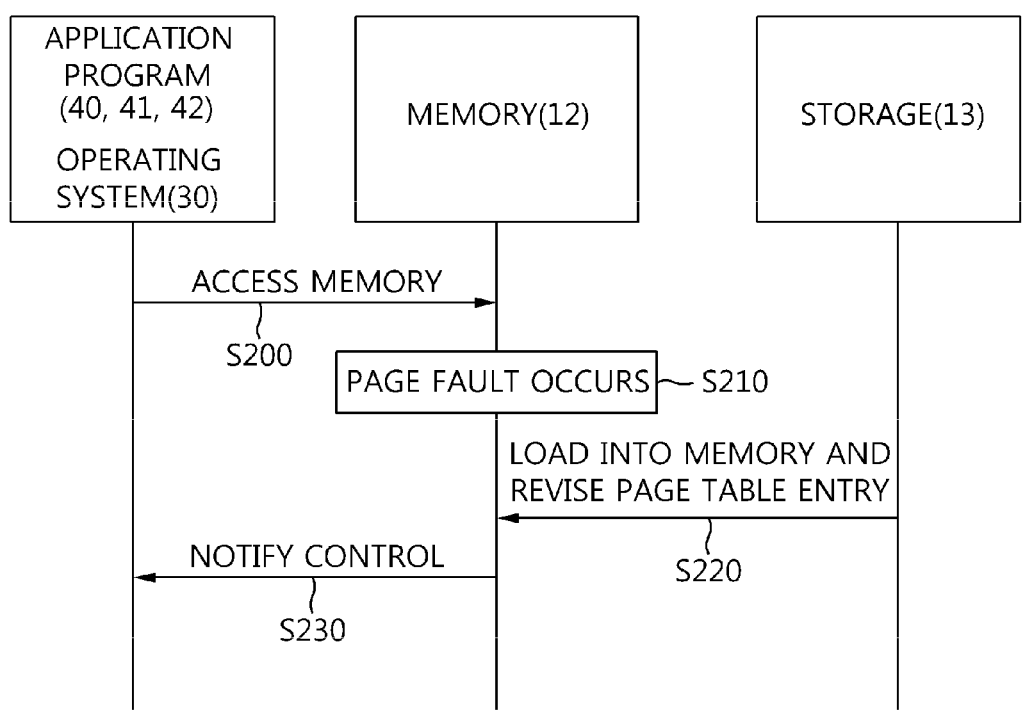
FIG. 5 is a diagram showing a procedure for processing a page fault occurring immediately after booting has been performed.

FIG. 5 illustrates a procedure for processing a page fault occurring immediately after booting has been performed.

Referring to FIGS. 1, 4, and 5, the procedure for processing the page fault shown in FIG. 4 can be seen. At step S200 where the operating system 30 or the application program 40, 41 or 42 accesses the memory after the memory virtualization-based snapshot booting according to the present invention has been performed, a page fault occurs when the accessed page is not restored at step S210. In this case, control proceeds to the page fault handler of the virtual machine monitor 20. The page fault handler loads the memory page, which is not restored, from the storage 13 into the memory 12, and revises the entry of the secondary page table at step S220. Thereafter, the page table handler hands over control to the operating system 30 or the application program 40, 41, or 42 which causes the page fault by notifying the operating system or the application program of control at step S240. As described above, the memory virtualization-based snapshot boot apparatus 100 according to the present invention may improve booting speed by omitting the memory status information 240 of the snapshot image 200 or loading only a part of the memory status information via the virtual machine monitor 20, and may utilize the page fault handler of the virtual machine monitor 20 so as to solve a page fault occurring due to such omission or partial loading.

Hereinafter, a memory virtualization-based snapshot boot method according to the present invention will be described in detail.

Figure 6:
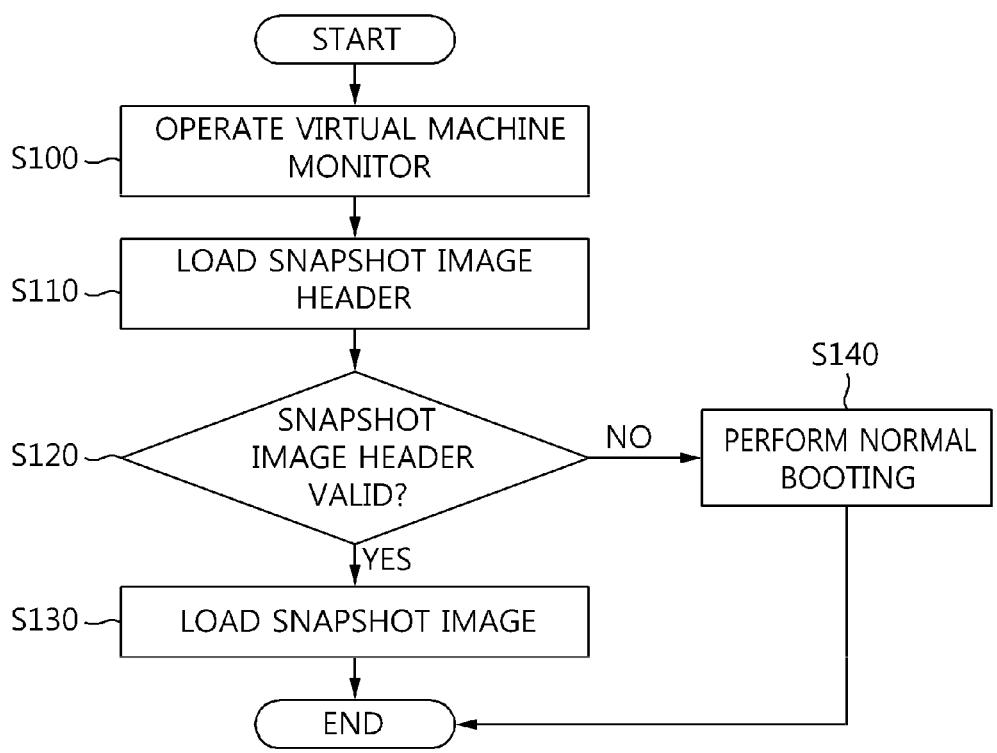
FIG. 6 is an operation flowchart showing a memory virtualization-based snapshot boot method according to the present invention.

FIG. 6 is an operation flowchart showing a memory virtualization-based snapshot boot method according to the present invention.

Referring to FIG. 6, in the memory virtualization-based snapshot boot method according to the present invention, the power of the system is applied, and the virtual machine monitor is operated at step S100. Further, after the header of a snapshot image is loaded from the storage at step S110, it is determined whether the header of the snapshot image is valid at step S120. If it is determined at step S120 that the header of the snapshot image is valid, booting is performed by loading the snapshot image at step S130, whereas if it is determined at step S120 that the header of the snapshot image is not valid, booting is performed using a normal booting method without utilizing the snapshot image at step S140. When the snapshot image is loaded at step S130, a part of status information stored in the snapshot image is loaded. Here, the loaded status information may include memory page table and MMU status information or the like, and the status information may include a plurality of pieces of status information corresponding to different operating systems. In this case, at the loading step S130, any one of the plurality of pieces of status information may be loaded into the memory. Further, after the status information has been loaded at step 5130, the status information stored in the storage is updated. As described above, the reason for loading only a part of the status information stored in the snapshot image is that most of the time required for snapshot booting is consumed in reading the snapshot image stored in the storage into the memory, and most of the snapshot image is the memory status information of the pieces of status information. For example, when system booting starts and the virtual machine monitor is operated, if the snapshot image header is loaded and is determined to be valid, the process returns to the time of restoration of status information by loading only the status information other than the memory status information 240 from the snapshot image, thus completing booting.

Figure 7:
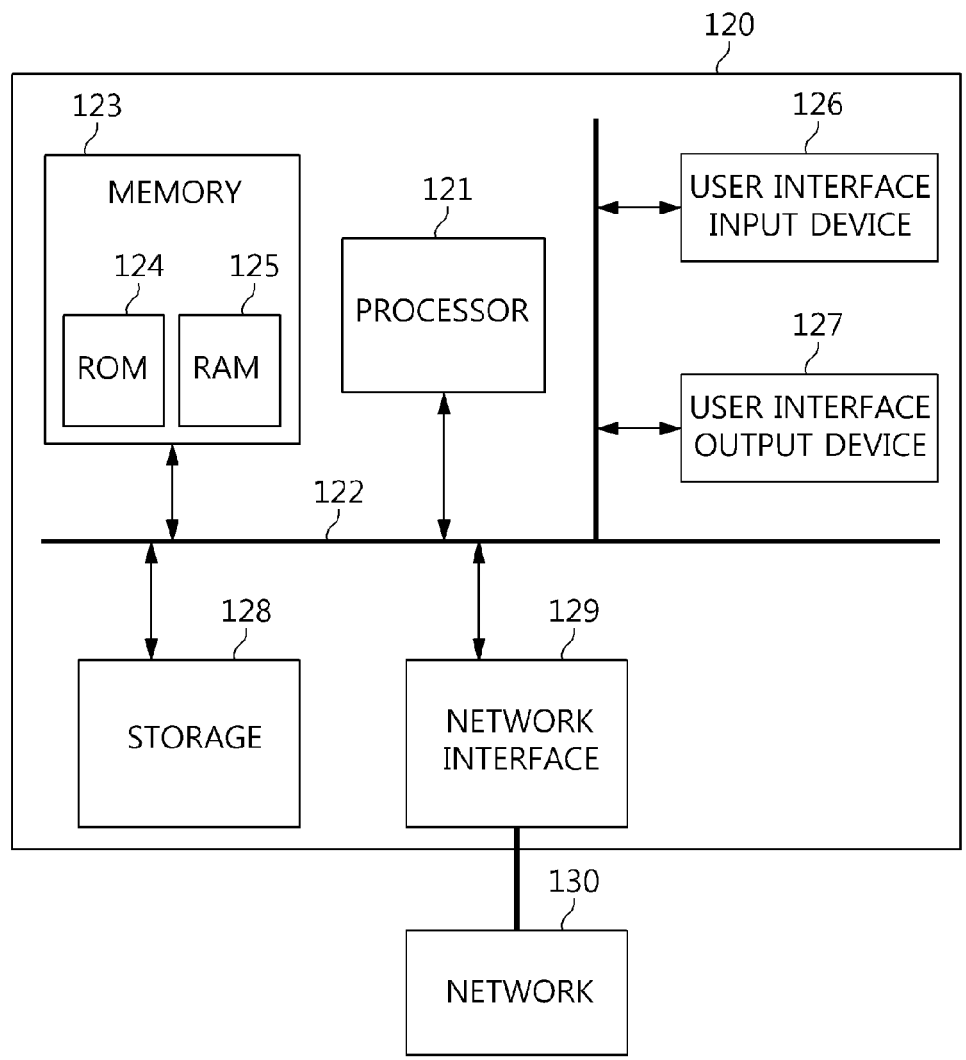
FIG. 7 is an embodiment of the present invention implemented in a computer system.

FIG. 7 is an embodiment of the present invention implemented in a computer system.

Referring to FIG. 7, An embodiment of the present invention may be implemented in a computer system, e.g., as a computer readable medium. As shown in in FIG. 7, a computer system 120 may include one or more of a processor 121, a memory 123, a user input device 126, a user output device 127, and a storage 128, each of which communicates through a bus 122. The computer system 120 may also include a network interface 129 that is coupled to a network 130. The processor 121 may be a central processing unit (CPU) or a semiconductor device that executes processing instructions stored in the memory 123 and/or the storage 128. The memory 123 and the storage 128 may include various forms of volatile or non-volatile storage media. For example, the memory may include a read-only memory (ROM) 124 and a random access memory(RAM) 125.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

As described above, the present invention is advantageous in that a system is booted by loading only a part of a snapshot image to solve the disadvantage of the above-described conventional technology.

Further, the present invention is advantageous in that it supports the efficient operation of the system via virtualization technology upon loading a part of a snapshot image and booting the system.

Furthermore, the present invention is advantageous in that, after memory virtualization-based snapshot booting has been performed, a page fault, occurring because the memory status information is not loaded, is processed by the page fault handler of the virtual machine monitor.

As described above, in the memory virtualization-based snapshot boot apparatus and method according to the present invention, the configurations and schemes in the above-described embodiments are not limitedly applied, and some or all of the above embodiments can be selectively combined and configured so that various modifications are possible.

What is claimed is:

1. A memory virtualization-based snapshot boot apparatus, comprising:
   a hardware unit including a processor, a memory, and a storage, the storage storing status information corresponding to an operating system; and
   a Virtual Machine Monitor (VMM) operated by the processor and configured to operate the operating system by loading the status information into the memory,
   wherein the status information is stored as a snapshot image, the snapshot image being classified and stored depending on types of the status information,
   wherein the virtual machine monitor comprises a determination unit for determining whether a header of the snapshot image is valid or not and a loading unit for, if it is determined by the determination unit that the snapshot image header is valid, loading the snapshot image, and
   wherein the loading unit classifies and loads the snapshot image depending on the types of the status information.

2. The memory virtualization-based snapshot boot apparatus of claim 1, wherein the snapshot image is stored such that the types of the status information are classified into Central Processing Unit (CPU) status information, peripheral device status information, memory page table and Memory Management Unit (MMU) status information, and memory status information.

3. The memory virtualization-based snapshot boot apparatus of claim 1, wherein the loading unit loads CPU status information, peripheral device status information, and memory page table and MMU status information.

4. The memory virtualization-based snapshot boot apparatus of claim 3, wherein:
   the memory page table is a primary page table managed by the operating system, and
   a secondary page table set to cause a page fault for an address translated by the primary page table is generated.

5. The memory virtualization-based snapshot boot apparatus of claim 4, wherein the virtual machine monitor is configured such that, when the page fault occurs, a memory page in which the page fault occurs is loaded from the memory status information stored in the storage into the memory via a page fault handler, and a page table entry is updated.

6. The memory virtualization-based snapshot boot apparatus of claim 1, wherein the status information includes a plurality of pieces of status information corresponding to different operating systems, and the loading unit loads one of the plurality of pieces of status information into the memory.

7. The memory virtualization-based snapshot boot apparatus of claim 1, wherein the virtual machine monitor updates the status information stored in the storage after the status information has been loaded into the memory.

8. A memory virtualization-based snapshot boot method, comprising:
   operating a virtual machine monitor;
   loading a header of a snapshot image;
   determining whether the snapshot image header is valid or not; and
   loading the snapshot image,
   wherein the snapshot image is classified depending on types of status information and is stored in a storage,
   wherein loading the snapshot image comprises, if it is determined at validity determining that the snapshot image header is valid, classifying and loading the snapshot image depending on the types of the status information, and
   wherein if it is determined at validity determining that the snapshot image header is not valid, normal booting is performed without loading the snapshot image being performed.

9. The memory virtualization-based snapshot boot method of claim 8, wherein the snapshot image is stored such that the types of the status information are classified into Central Processing Unit (CPU) status information, peripheral device status information, memory page table and Memory Management Unit (MMU) status information, and memory status information.

10. The memory virtualization-based snapshot boot method of claim 8, wherein loading the snapshot image comprises loading CPU status information, peripheral device status information, and memory page table and MMU status information.

11. The memory virtualization-based snapshot boot method of claim 10, wherein:
   the memory page table is a primary page table managed by an operating system, and
   a secondary page table set to cause a page fault for an address translated by the primary page table is generated.

12. The memory virtualization-based snapshot boot method of claim 11, wherein the virtual machine monitor is configured such that, when the page fault occurs, a memory page in which the page fault occurs is loaded from the memory status information stored in the storage into a memory via a page fault handler, and a page table entry is updated.

13. The memory virtualization-based snapshot boot method of claim 8, wherein the status information includes a plurality of pieces of status information corresponding to different operating systems, and loading the snapshot image comprises loading one of the plurality of pieces of status information into a memory.

14. The memory virtualization-based snapshot boot method of claim 8, wherein the virtual machine monitor updates the status information stored in the storage after the status information has been loaded into a memory.

* * * * *